(12) United States Patent
Ismail et al.

(10) Patent No.: US 10,963,406 B2
(45) Date of Patent: Mar. 30, 2021

(54) PERSISTENT UNIVERSAL SERIAL BUS (USB) DEVICE ENUMERATION

(71) Applicant: Intel Corporation, Santa Clara, CA (US)

(72) Inventors: Abdul Rahman Ismail, Beaverton, OR (US); Rajaram Regupathy, Bangalore (IN); Balaji Manoharan, Tamilnadu (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/445,027

(22) Filed: Jun. 18, 2019

(65) Prior Publication Data

US 2019/0303321 A1    Oct. 3, 2019

(51) Int. Cl.
*G06F 13/42* (2006.01)
*G06F 13/20* (2006.01)

(52) U.S. Cl.
CPC .......... *G06F 13/20* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 6,772,266 | B2* | 8/2004 | Nalawadi | G06F 13/387 710/305 |
| 6,839,793 | B2* | 1/2005 | Ragland | G06F 13/4022 710/316 |
| 8,862,787 | B2* | 10/2014 | Kriegelstein | G06F 9/4411 710/8 |
| 9,170,828 | B2* | 10/2015 | Borve | G06F 9/4411 |
| 9,460,037 | B2* | 10/2016 | Voto | G06F 13/4282 |
| 2002/0156952 | A1* | 10/2002 | Shono | G06F 13/4081 710/104 |

* cited by examiner

*Primary Examiner* — Elias Mamo
(74) *Attorney, Agent, or Firm* — Patent Capital Group

(57) ABSTRACT

Embodiments may relate to a universal serial bus (USB)-enabled apparatus that includes one or more USB devices that are coupled with a USB host controller by a persistent connection. The USB host controller may identify that the USB device is persistently coupled and then identify USB device information related to the USB device, wherein the USB device information is stored prior to the identification of the USB device. The USB host controller may then use that identified information to perform USB enumeration. Other embodiments may be described or claimed.

18 Claims, 9 Drawing Sheets

PERSISTENT UNIVERSAL SERIAL BUS (USB) DEVICE ENUMERATION

BACKGROUND

When a universal serial bus (USB) device is connected to an electronic device such as a computing system, enumeration may be performed. Enumeration may be considered to be the process of determining which device has been connected to the bus, and what parameters may be required to support the device. Example parameters may include power consumption, number or type of endpoints, class of product, etc. The host controller of the electronic device may then assign the USB device an address and enable a configuration that allows the USB device to transfer data on the bus.

DETAILED DESCRIPTION

Figure 1:
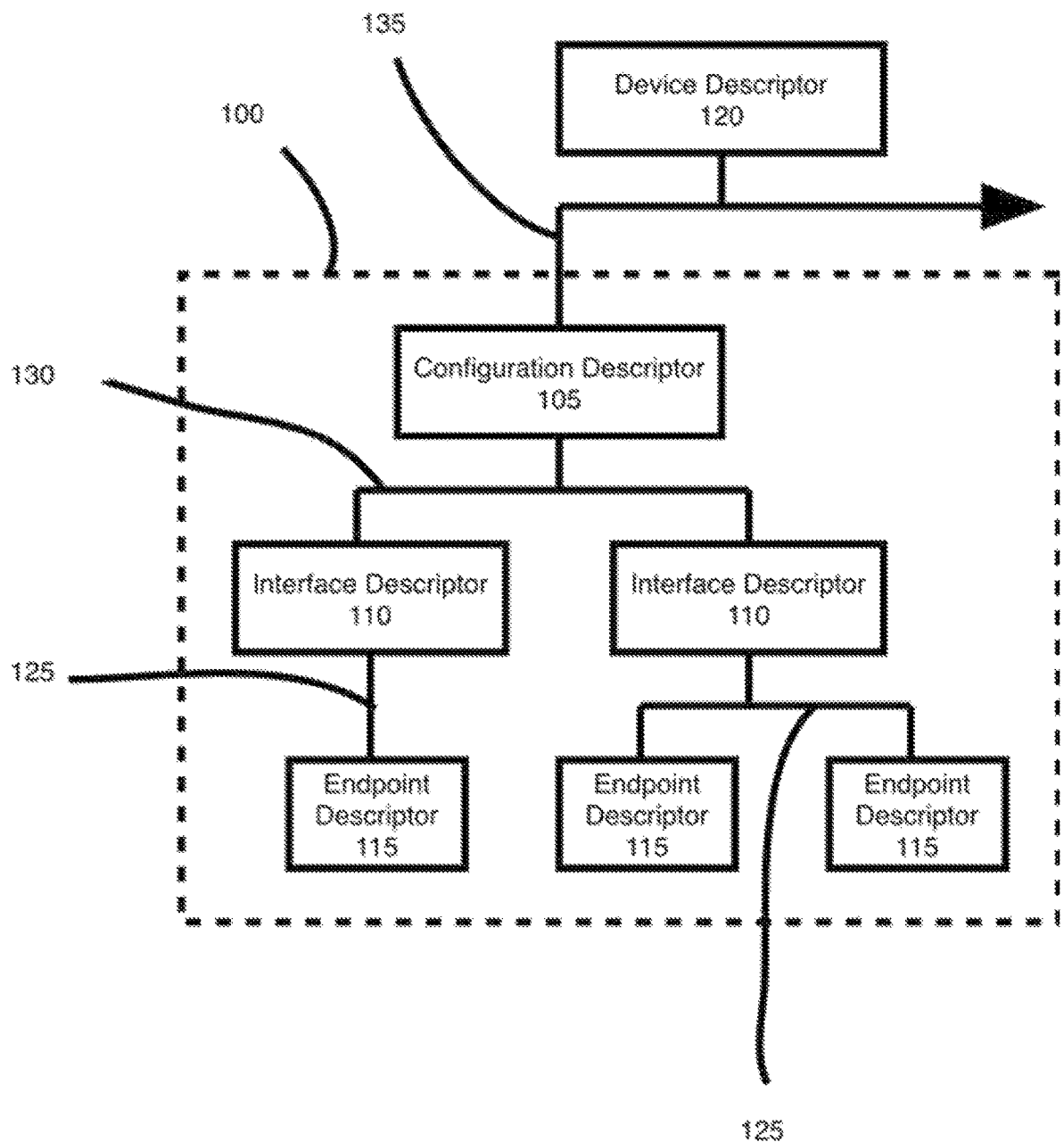
FIG. 1 depicts an example of a USB descriptor tree, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

In the USB ecosystem, USB devices may be accessed by a USB address that is assigned when the device is attached and enumerated. Generally, USB devices may support a specially designated pipe at endpoint zero, to which the USB device's USB control pipe will be attached during enumeration. USB devices may support a common access mechanism for accessing information through this control pipe. Associated with the control pipe at endpoint zero is the information that may be used to describe the USB device.

The information used to describe the USB device may include a number of categories such as "Standard," "Class," and "Vendor." The Standard category may include information whose definitions is common to USB devices and includes items such as vendor identification, device class, or power management capability. Device, configuration, interface, and endpoint descriptions may carry configuration-related information about the device. The Class category may include information that is related to the device class of the USB device. This sort of information may vary from USB device to USB device. The Vendor category may include information that is generated by the vendor of the USB device and may vary from vendor to vendor or device to device.

Generally, USB devices may report their attributes using descriptors. A descriptor may be a tree-like data structure with a defined format. FIG. 1 depicts an example of a USB descriptor tree, in accordance with various embodiments. Specifically, FIG. 1 depicts an example configuration descriptor set 100. It will be understood that this configuration descriptor set 100 is intended as an example, and other embodiments may have other numbers of elements in different configurations.

The configuration descriptor set 100 may include a configuration descriptor 105. The configuration descriptor 105 may describe information about a specific device configuration of the USB device. In real-world embodiments, a USB device may have one or more configuration descriptors. Each configuration may have one or more interfaces, and each interface may have zero or more endpoints. Generally, an endpoint may not be shared among interfaces within a single configuration. However, in some configurations an endpoint may be shared if the endpoint is used by alternate settings of the same interface. In some cases, endpoints may be shared among interfaces that are part of different configurations.

The configuration descriptor 105 may include a number of interface descriptors 110. The interface descriptors 110 may be categorized by a parameter such as "bNumInterfaces" 130 or some other categorization. bNumInterfaces may indicate, for example, the number of interface descriptors for a given configuration descriptor. Generally, an interface descriptor 110 may describe a specific function within a configuration. An interface may include alternate settings that allow the endpoints or their characteristics to be varies after the device has been configured. The default setting for an interface may be "0" in some embodiments.

The interface descriptor 110 may include a number of endpoint descriptors 115. The endpoint descriptors 115 may be categorized by a parameter such as "bNumEndpoints" or some other categorization. bNumEndpoints may indicate, for example, the number of endpoint descriptors for a given interface descriptor. Generally, the endpoint descriptor 115 may contain the information required by a host controller to determine the bandwidth requirements of a given endpoint.

The top of the tree may be a device descriptor 120. The device descriptor 120 may describe general information about the USB device, and include information that applies globally to the device and all of the device's configurations. A USB device may generally have only one device descriptor, and the device descriptor may include a number of configuration descriptor sets similar to configuration descriptor set 100. The configuration descriptor sets may be categorized by a parameter such as "bNumInterfaces" 135, which may indicate the number of configuration description sets for a given USB device.

Figure 2:
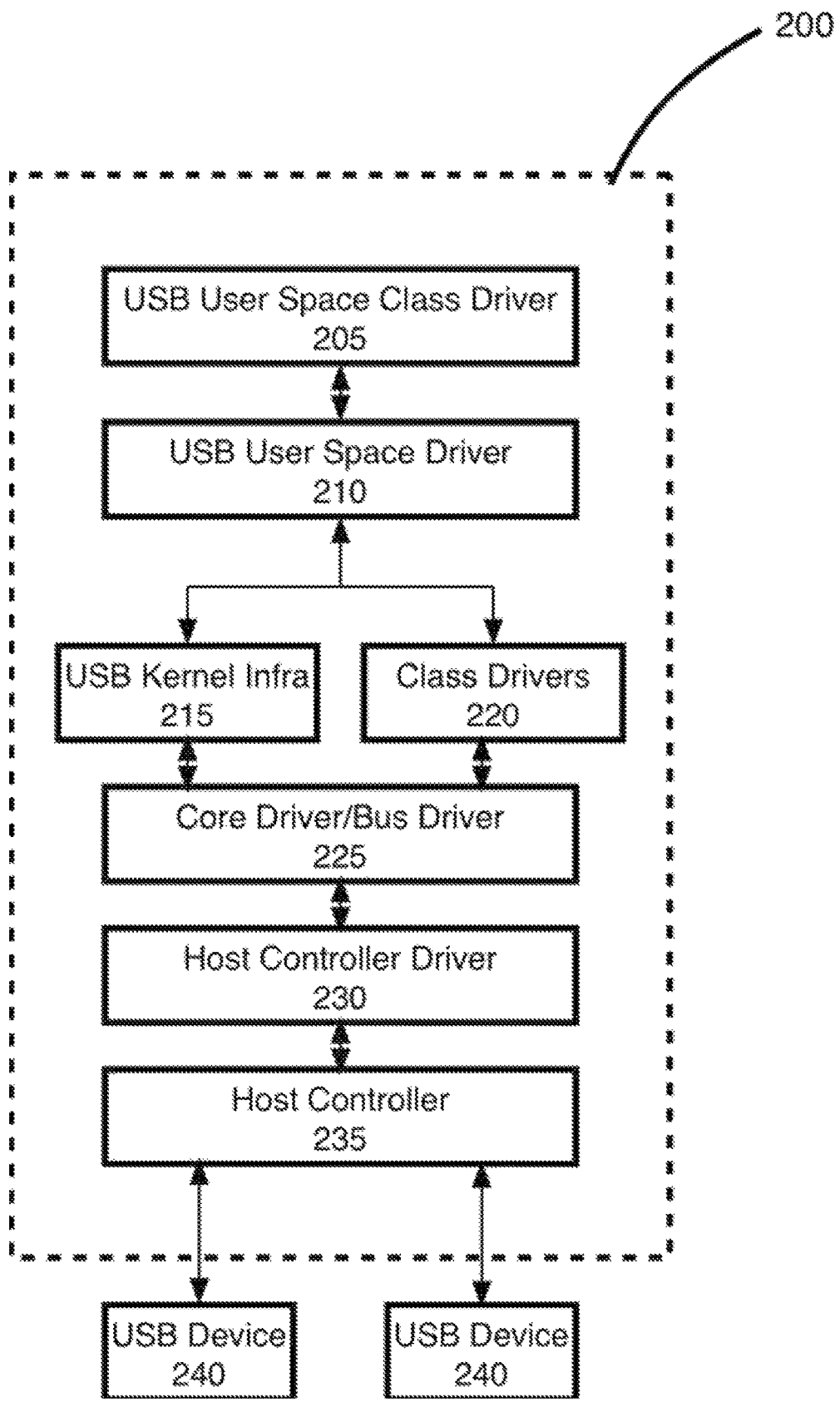
FIG. 2 depicts an example of a USB architecture, in accordance with various embodiments.

FIG. 2 depicts an example of a USB architecture 200, in accordance with various embodiments. In some embodiments the USB architecture 200 may be referred to a "USB Host driver architecture." The specific USB architecture 200 may be an architecture of a Linux operating system In this embodiment, the different blocks of the USB architecture such as the host controller, state machine, functions/class may be implemented in a modular fashion. However, in other embodiments the architecture may be implemented in a different manner in different operating systems. In some cases, the function driver or the class driver may be managed within the kernel, or abstracted to the user space.

Specifically, the operating system or system on chip that implements the USB architecture 200 may include various drivers arranged in a hierarchical fashion such as a USB user space class driver 205, a USB user space driver 210, USB kernel infrastructure 215, class drivers 220, core drivers/bus drivers 225, and a host controller driver 230. These drivers may be loaded into a host controller 235 which may be communicatively coupled with a USB device 240. The host controller 235 may serve to provide information or instructions to, or receive data from, a USB device 240 on behalf of the electronic device of which the USB architecture 200 is a part. The USB devices 240 may be devices that are coupled with the USB architecture 200. Such devices may include, for example, storage devices, cameras, microphones, input/output (I/O) devices, or some other type of device.

When USB devices are connected, the control and data flow may happen through the depicted blocks, and drivers may be loaded for the interface based on user space rules. As a result, enumeration and configuration of each USB device may take a significant amount of time. When multiple USB devices are coupled with the USB architecture, the N$^{th}$ device may be enumerated with a factor of N*the enumeration time because the USB devices may be enumerated and drivers may be loaded in a sequential order by operating systems.

One example scenario where multiple USB devices may be coupled with the host controller may be an automotive solution or other type of motor vehicle where multiple USB devices such as cameras or displays may be communicatively coupled to the host controller. For example, some motor vehicles may include USB cameras on various mirrors, the front bumper, the rear bumper, on top of the vehicle, etc. The motor vehicle may also include one or more display screens within the vehicle. These USB devices may be permanently or persistently coupled with the host controller.

As used herein, a "persistent" connection may mean a connection that is hardwired such that separating the connection may require some sort of tools to remove a solder joint, snip a wire, etc. By contrast, a non-persistent connection may mean a connection wherein the USB device is communicatively coupled with the host controller by a removable plug, cable, or other connection that may be removed by a user. An example of a non-persistent connection may be a cable that is inserted into a USB port of an electronic device. In some embodiments, a USB device that is coupled with a host device by a persistent USB connection may be referred to as a "static USB device" or a "statically-connected USB device."

In the automotive example, when multiple high-bandwidth USB cameras or displays are coupled with the host controller, enumeration may begin when the car is turned on. However, as noted above, the enumeration for N devices may take N*the enumeration time of each device, which may result in significant time spent enumerating and otherwise initializing the USB devices before they are operational. This initialization time may not be viewed as preferable by the operator of the motor vehicle.

Embodiments herein may relate to a persistent enumeration process which may reduce the number of enumeration commands, resulting in a faster initialization process. Specifically, embodiments herein may relate to a software-based persistent enumeration process or a hardware-based persistent enumeration process.

The software-based persistent enumeration process may include storage, in the host device, of the hashed values of the descriptors of USB devices that are coupled with the host device by a persistent connection. In some embodiments, the hashed values may be stored by the software driver or host controller of the host device. The USB devices may be on-board or part of the host device, while in other embodiments the USB devices may be separate from the host device but still coupled to the host device by a persistent connection (e.g., a device with a housing that is physically separate from the structure of the host device, but still communicatively coupled with the host device by a persistent USB connection). The USB device may indicate its persistent connection using an indicator in the USB device's binary device object store (BOS) descriptor, and the host may use one or more of the stored hash values related to the USB device during enumeration. The stored hash values may include, for example, a USB descriptor tree, or elements thereof, such as those shown in FIG. 1. In this way, the host device may use the stored hashed values to move the device state from an "address" state to a "configured" state.

In the hardware-based persistent enumeration process, embodiments may reduce or minimize software intervention during enumeration by providing a port-specific register in the host controller which may indicate the USB device is a statically-connected device. Specifically, a value in the register may allow the host controller to identify that the USB device that is coupled with a specific port is a statically-connected device. Based on this identification, the host controller may run a persistent enumeration process with the help of pre-stored device details. The device details may include a USB descriptor tree, or portions thereof, such as that shown in FIG. 1. During the hardware-based persistent enumeration technique, having pre-stored details of the USB device may allow the enumeration of the USB device to be completed by moving from an "address" state to a "configured" state without software intervention. The hardware-based enumeration process may also allow for the host controller to indication that the USB device configuration is complete using a status register with an interrupt request (IRQ).

The hardware-based or software-based persistent enumeration process may provide a number of advantages. For example, USB devices may be an important element in embedded systems where boot-time may be an important consideration. When USB-based peripherals are connected to the system by a persistent connection, the hardware-based or software-based persistent enumeration processes may reduce the enumeration time by limiting the number of enumeration commands used. As a result, embodiments may enable time-critical embedded solutions to meet stricter boot-time requirements without being hampered by a relatively lengthy USB enumeration process.

Figure 3:
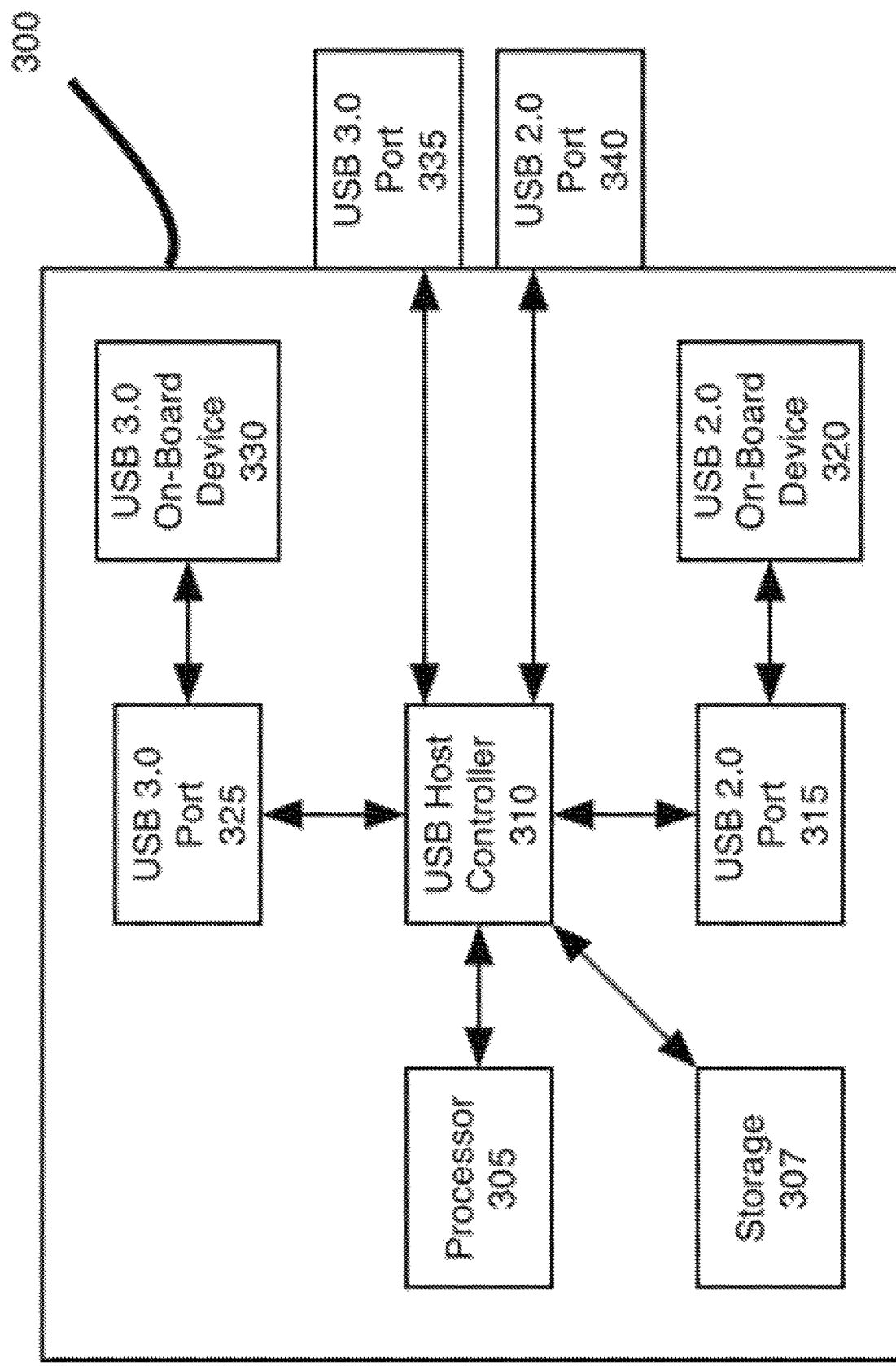
FIG. 3 depicts an example USB platform with persistent USB devices, in accordance with various embodiments.

FIG. 3 depicts an example USB platform 300 with persistent USB devices, in accordance with various embodiments. In some embodiments, the USB platform 300 may be referred to as a "host device." Generally, the USB platform 300 may be considered to be an electronic device to which USB devices, either persistent or non-persistent," are coupled. For example, in some embodiments the elements of the USB platform 300 may be distributed throughout a larger electronic device such as a motor vehicle, a computer, a server, etc. In other embodiments the elements of the USB platform 300 may be within a singular housing, or located on a singular printed circuit board (PCB) or piece of silicon. In some embodiments if the USB devices are on-board the USB platform 300, that is the USB devices are physically connected to or coupled with the USB platform, then the USB devices may be considered to be an element of the USB platform 300. In other embodiments, the USB devices may be considered to be separate from, but physically coupled to, the USB platform 300.

It will be understood that FIG. 3 is intended as an example of such a USB platform 300 and other embodiments may have more or fewer elements, elements in a different location, etc. For example, the USB platform 300 may include a plurality of processors, may include extra elements not shown or discussed herein, may include fewer elements (e.g., only a single USB on-board device, a single USB port, etc.) or other variations. It will also be understood that although some elements of FIG. 3 are depicted as separate from one another, e.g. the processor 305 and the USB host controller 310, in some embodiments certain elements may be coupled with one another (e.g., physically in the same piece of silicon). In some embodiments, certain elements such as the USB host controller 310 may be implemented as an element of the processor 305 such as software or firmware implemented on the processor 305. In some embodiments each of the elements may be implemented in a single housing or on a single board of an electronic device, whereas in other embodiments certain elements such as the processor 305 or the storage 307 may be implemented separately from, but communicatively coupled with, the USB platform 300. Other variations may be present in other embodiments.

The USB platform 300 may include a processor 305. The processor may be, for example, a central processing unit (CPU), a general processing unit (GPU), or some other type of processor. In some embodiments the processor 305 may be a unitary processor, and in some embodiments the processor 305 may be a distributed processor which may include a number of processor cores that are communicatively coupled with one another. In some embodiments the processor 305 may be a distributed processor or a single core thereof.

The USB platform 300 may also include a storage 307. The storage 307 may be, for example, a volatile or a non-volatile memory. For example, the storage 307 may be a flash memory, a random-access memory (RAM), a dynamic RAM (DRAM), or some other type of memory. Generally, the storage 307 may be configured to store information related to a static USB device as will be described in further detail.

The processor 305 and the storage 307 may be communicatively coupled with a USB host controller 310, which may be similar to, and share one or more characteristics of, the host controller 235 described with respect to FIG. 2. The USB host controller 310 may serve as a centralized interface that enables communication in accordance with the USB protocol(s) between various USB devices, or between various USB devices and the processor 305. For example, the USB host controller 310 may be a processor or some other type of logic that is able to receive, identify, generate, or other process one or more signals in accordance with a USB protocol.

The host controller 310 may be communicatively coupled with a number of USB ports. For example, the host controller 310 may be coupled with USB ports that operate in accordance with a second-generation USB protocol, which may be referred to as USB 2.0. The USB platform 300 may include an "internal" or "on-board" USB 2.0 port 315 and an external USB 2.0 port 340.

As used herein, the internal USB 2.0 port 315 may be a USB 2.0 port that is configured to be coupled with an on-board USB device such as the USB 2.0 on-board device 320. Specifically, the USB 2.0 port 315 and the USB 2.0 on-board device 320 may be coupled through a persistent or non-persistent connection as described above. Similarly, the USB 2.0 port 315 and the USB host controller 310 may be coupled by a persistent connection.

By contrast, the external USB 2.0 port 340 may be located at a periphery of the USB platform 300. The external USB 2.0 port 340 may be configured to communicatively couple, via a persistent or non-persistent connection, with a USB device that is separate from the USB platform 300.

The host controller 310 may also be coupled with USB ports that operate in accordance with a third generation USB protocol, which may be referred to herein as USB 3.0. The USB platform 300 may include an internal" or "on-board" USB 3.0 port 325 and an external USB 3.0 port 335. The USB platform 300 may also include a USB 3.0 on-board device 330. Generally, in a manner similar to that described above with respect to the various USB 2.0 elements, the USB 3.0 on-board device 330 may be communicatively coupled with the USB 3.0 port via a persistent or non-persistent connection. A separate USB device may be coupled with the USB 3.0 port 335 by a persistent or a non-persistent connection as described above.

It will be understood that this description of the USB platform 300 with respect to the USB 2.0 and the USB 3.0 protocols is intended as one example description. In other embodiments, the USB platform may include addition on-board or external USB ports that operate in accordance with other iterations of the USB specification, either now known or hereafter developed.

Figure 4:
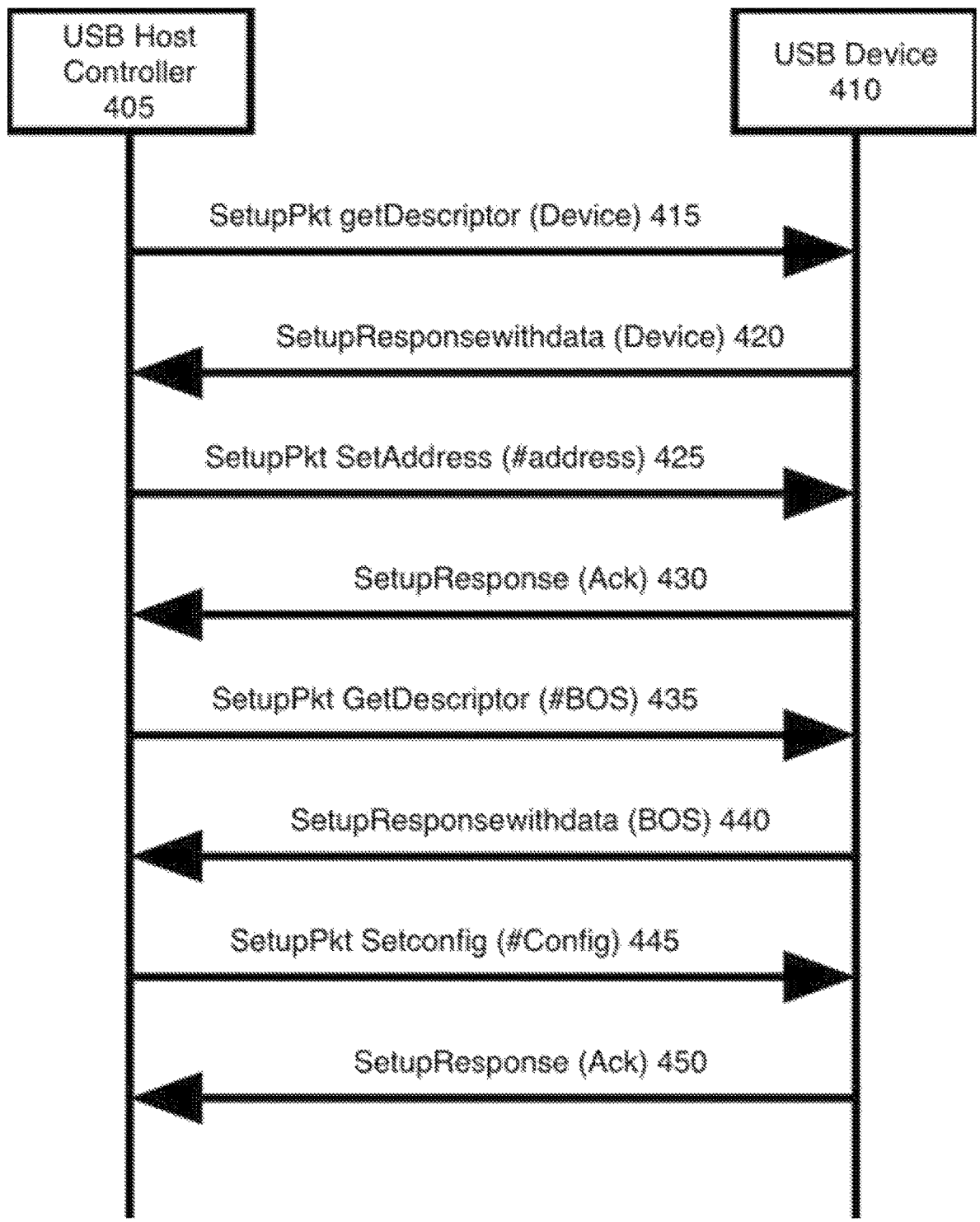
FIG. 4 depicts a high-level example of a software-based persistent USB device enumeration process flow, in accordance with various embodiments.

FIG. 4 depicts a high-level example of a persistent USB device enumeration process flow, in accordance with various embodiments. Specifically, FIG. 4 may depict an example of communication between a USB host controller 405 (which may be similar to, and share one or more characteristics of, the USB host controller 310) and a USB device 410 (which may be similar to, and share one or more characteristics of, USB devices 320 or 330 or some other device discussed herein). Specifically, the enumeration process flow may relate to enumeration of a statically-connected USB device.

As can be seen in FIG. 4, the process flow may generally relate to transmission by the USB host controller 405 of one or more setup packets, which may be referred to as a "SetupPkt." In response to the setup packets, the USB device 410 may transmit a response packet, which may be referred to as a "SetupResponse." It will be understood that although specific names of packets may be used in FIG. 4, these names are intended as examples and in other embodiments different packet names may be used. As an example, different USB specifications may involve different packet names which may still perform functions similar to those discussed herein.

The process may include transmission, by the USB host controller 405, of a request for a descriptor from the USB device 410 at 415. Specifically, the USB host controller 405 may transmit a message such as a "SetupPkt getDescriptor (Device)" which may be a request for a device descriptor of the USB device 410 such as device descriptor 120.

In response to the descriptor request, the USB device 410 may transmit a response at 420 with the requested data. For example, the USB device 410 may transmit a "SetupResponsewithData (Device)" which may be a response packet that includes the requested device descriptor.

The USB host controller 405 may then identify an address which it may use to communicate with the USB device 410. Based on this address, the USB host controller 405 may transmit, at 425, an indication of the address to the USB device 410. The indication may be, for example, a transmission such as "SetupPkt SetAddress (#address)" at 425. In response to the indication of the address the USB device 410 may transmit an acknowledgement response at 430. The response may be, for example "SetupResponse (Ack)" at 430. At this point, the USB device 410 may be considered to be in an "addressed" state.

The USB host controller 405 may then send a request for the BOS descriptor to the USB device 410 and 435. Specifically, the USB host controller 405 may send a transmission such as "SetupPkt getDescriptor (#BOS)" at 435. In response, the USB device 410 may transmit a response that includes the USB device's BOS. As an example, the USB device 410 may transmit the "SetupResponsewithdata (BOS)" at 440.

As noted, the BOS may include an indication that the USB device 410 is coupled with the USB host controller 405 by a persistent connection. Based on this indication, the USB host controller 405 may access previously stored hashed data related to the USB device 410. The hashed data may include various elements of the configuration descriptor set 100 discussed above. As noted, the hashed data may be stored by the software driver of the host device, or host controller of the host device such as USB host controller 405, or in a memory or other storage medium that is communicatively coupled with the USB host controller 405. Specifically, in some embodiments the hashed data may be stored in a storage like storage 307. In some embodiments, the hashed data may be organized or indexed based on a variety of values such as the vendor ID of the USB device 410, a product ID of the USB device 410, elements of the configuration descriptor set 100 of the USB device 410, the device descriptor 120 of the USB device, or some other value.

Generally, the device data may be described herein as "hashed," which means that the data is stored in a pre-identified way that makes access and identification of the data possible by an electronic device. The hashed values may be pre-stored prior to the beginning of the persistent enumeration process. For example, in some embodiments a host controller, a processor, or some other entity may receive the device data when the USB device is first coupled with a USB platform. The host controller/processor/other entity may then generate a hash of the data and store the data in, for example, the host controller or some other storage location. This data may then be used for future enumeration processes. In other embodiments the device data or the hash may be manually generated or stored, for example by a user or manufacturer of the electronic device one the USB device is communicatively coupled with the USB host controller.

Based on the pre-stored hashed values related to the USB device 410, the USB host controller 405 may be able to perform one or more configuration and identification processes without requesting additional information from the USB device 410. When the configuration processes are complete, the USB host controller 405 may transmit a packet related to the configuration that the USB device 410 is to use at 445. The packet may be, for example, a "SetupPkt Setconfig (#Config)" packet at 445. After processing the packet, the USB device 410 may respond with an acknowledgement such as a "SetupResponse (Ack)" at 450. In this way, the USB device 410 may move from the "address" state to the "configured" state without providing further data to the USB host controller 405 subsequent to the provision of the BOS at 440.

Figure 5:
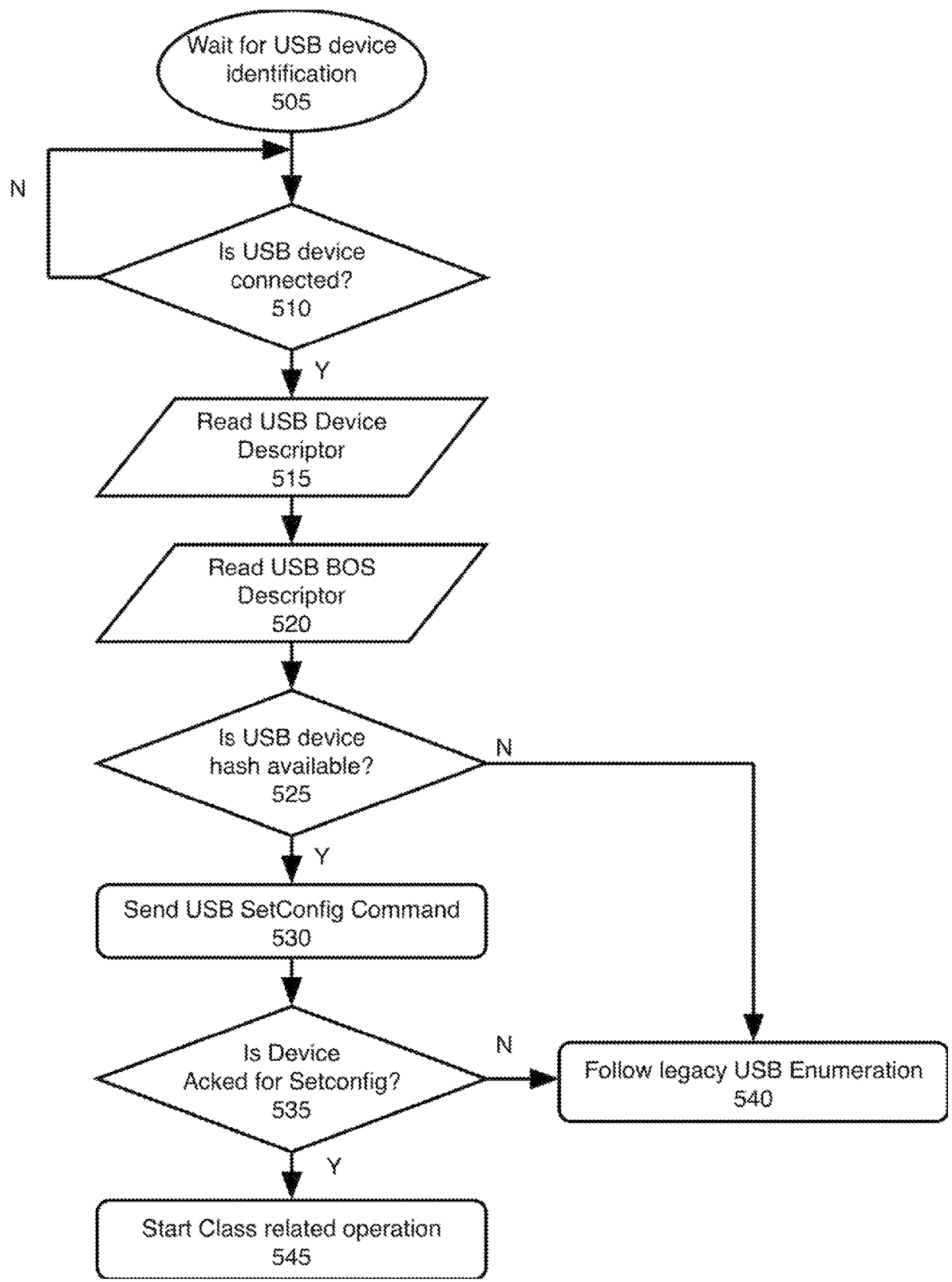
FIG. 5 depicts an example persistent USB device enumeration host controller process flow, in accordance with various embodiments.

FIG. 5 depicts an example persistent USB device enumeration host controller process flow, in accordance with various embodiments. For example, FIG. 5 may illustrate in greater detail the process elements that may be performed by a USB host controller such as USB host controller 405.

The process may include waiting, at 505, for identification of a USB device. For example, even though the USB device and the host controller may be persistently connected, when the electronic device is powered on there may be an initial period where the USB host controller is still identifying USB elements of the host controller. Therefore, the USB host controller may repeatedly query whether a USB device is connected at 510. If no USB device is identified, then the host controller may wait a given period of time before performing the query again.

However, if a USB device is detected at 510, then the host controller may read the USB device descriptor at 515. The USB device descriptor may be acquired, for example, by a setup packet and a response packet as described with respect to elements 415 and 420. The host controller may then read the USB BOS descriptor at 520. The USB BOS descriptor may be acquired as described with respect to elements 435 and 440 above. Based on the USB BOS descriptor, the USB host controller may identify that the USB device is coupled with the USB host controller by a persistent connection, and identify that a persistent enumeration technique may be desirable.

The USB host controller may then identify whether a USB device hash is available at 525. Specifically, the USB host controller may identify whether the above-described hashed data of the USB device may be present, such as stored in storage 307. If not, then the USB host controller may follow the legacy USB enumeration technique at 540. The legacy USB enumeration technique may include requesting, receiving, and processing additional data from the USB device which may be used to move the USB device from the "address" state to the "configured" state.

However, if the hashed device data is available then the USB host controller may be able to perform the additional configuration elements of the USB device using the hashed data as described above. The USB host controller may then send the USB Setconfig command at 530, which may be similar to element 445. The USB host controller may then wait to receive an acknowledgement from the USB device such as that discussed above with respect to 450. In some embodiments, the USB device may wait for a pre-specified amount of time (e.g., start a timer). If the timer expires prior to receiving the acknowledgement at 450, then the USB host controller may follow the legacy USB enumeration process at 540. However, if the USB host controller receives the acknowledgement at 535, then the USB host controller may identify that the USB device has moved into the configured state, and may start class-related USB operation at 545. As used herein, "class-related USB operation" may refer to USB class specific commands exchanged between USB host or host controller and a USB device. For example, the USB host may initiate the command exchange, and the USB device may provide a response to the command sent by host.

It will be understood that although the description of element 535 is made with respect to a timer, it will be understood that in other embodiments a different "success" criterion may be used for the acknowledgement when the host controller is identifying whether to move to element 540 or 545. Additionally, it will be understood that the above-described technique is one example technique and other techniques may vary. For example, some techniques may include additional or fewer elements, elements in a different order, elements performed concurrently, etc. In some embodiments, elements 530 and 535 may be repeated a number of times before identifying whether to move to elements 540 or 545. Other variations may be present.

Figure 6:
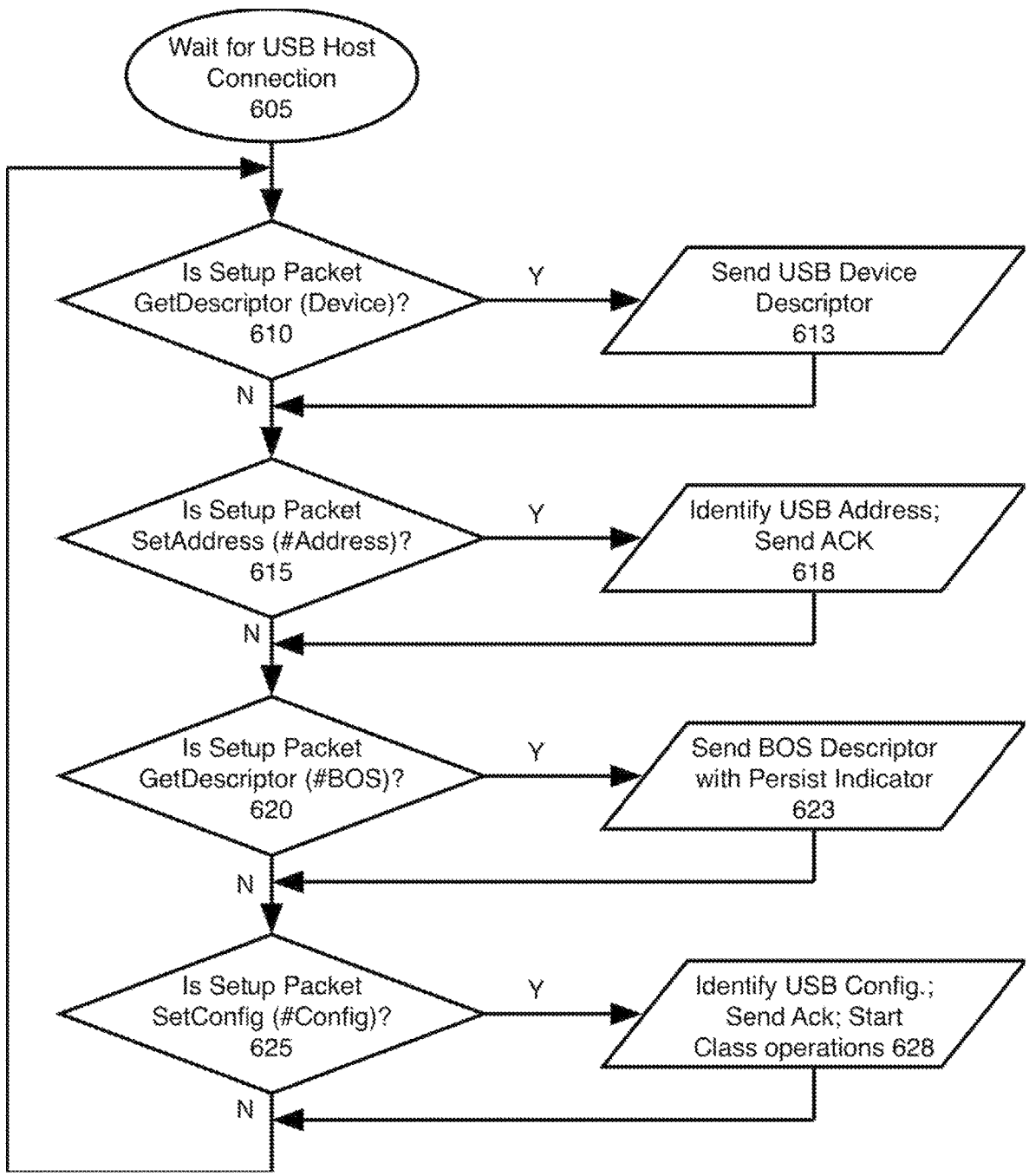
FIG. 6 depicts an example persistent USB device enumeration USB device process flow, in accordance with various embodiments.

FIG. 6 depicts an example persistent USB device enumeration USB device process flow, in accordance with various embodiments. For example, FIG. 6 may illustrate in greater detail the process elements that may be performed by a persistently-connected USB device such as USB device 410.

The process of FIG. 6 may include waiting, at 605, for a USB host connection. Similarly to element 505, the USB device may be persistently coupled with a USB host or a USB host controller, however it may not be "aware" of this connection until the electronic device of which the USB host controller and the USB device are a part is powered up. Then, the USB device and the USB host controller may perform an initial handshake procedure which may identify themselves to each other. The USB device may then enter a cyclical decision-making process where, if a packet is received, it performs a number of checks to identify what kind of packet it is and what the appropriate response may be. As can be seen in FIG. 6, the checks may generally describe the communication flow described with respect to FIG. 4.

Specifically, the USB device may check, at 610, whether a packet received from the USB host controller is a request for a device descriptor such as the SetupPkt getDescriptor (Device) at 415. If the packet is the request for the device descriptor, then the USB device may send, at 613, the USB device descriptor in a manner similar to the manner described above with respect to element 420.

The technique may then continue to element 615. In some embodiments, the USB device may activate a timer to wait for another packet from the USB host controller. In other embodiments, the USB device may perform the remaining checks sequentially and, as there is not another packet to process, it may return to the position between elements 605 and 610. In other embodiments, the process may be traversed in a different manner. For the sake of this discussion, it may be assumed that there is no timer and so the technique returns to the position between 605 and 610. These possible traversal alternatives may be present after other elements such as elements 615, 620, 625, etc., and similar assumptions may be made for the sake of discussion.

The USB device may then receive another packet from the USB host controller such as the addressing packet described at element 425. The USB device may check, at 610, whether the received packet is a request for a device descriptor. Assuming that check fails, the technique may consider to element 615 where the USB device may check whether the received packet is an addressing packet. Specifically, the USB device may check at 615 whether the received packet is a SetupPkt Set Address (#address) packet such as that described above with respect to element 425. If so, then the USB device may identify the address to use at 618. In some embodiments the addressing packet may include a number of options and the USB device may select from the various options. The USB device may also transmit an acknowledgement as described above with respect to 430. The technique may then return to the position between 605 and 610.

The USB device may then receive another packet from the USB host controller such the request for the BOS described above with respect to element 435. The USB device may perform the checks at 610 and 615, which may both fail. Then, the USB device may check at 620 whether the next packet received is a SetupPkt Get Descriptor (#BOS) as described with respect to element 435. If so, then the USB device may send, at 623, the BOS as described above with respect to element 440. Additionally, as noted, the BOS may include an indication that the USB device is persistently connected to the USB host controller. The technique may then return to the position between 605 and 610.

The USB device may then receive another packet from the USB host controller such as a configuration packet described above with respect to element 445. The USB device may perform the checks at 610, 615, and 620, which may fail. Then, the USB device may check at 625 whether the next packet received is a SetupPkt Setconfig (#Config) such as that described above with respect to element 445. If so, then the USB device may identify, at 628, the USB configuration to use. In some embodiments this identification may include selecting from a number of available options. The USB device may then send an acknowledgement such as that described with respect to element 450, and perform class operations.

It will be understood that this description of FIG. 6 is intended as one example description of a USB persistent enumeration technique from the point of view of the USB device, and other embodiments may include more or fewer elements, elements in a different order, elements performed concurrently, etc.

Figure 7:
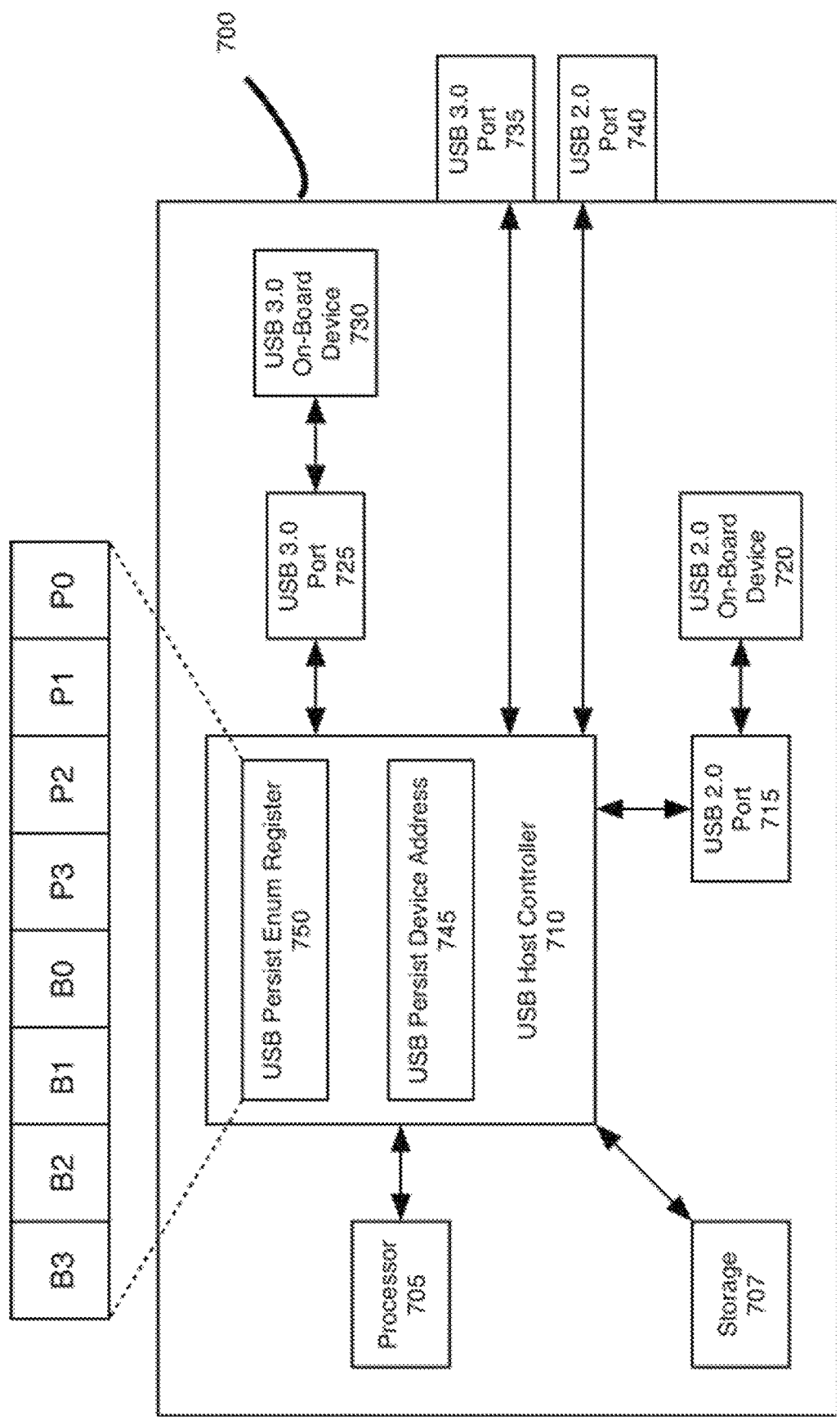
FIG. 7 depicts an alternative example USB platform with persistent USB devices, in accordance with various embodiments.

Generally, the elements of FIGS. 3-6 may be considered to be elements related to the software-based persistent enumeration process. FIG. 7 depicts an alternative example USB platform with persistent USB devices, in accordance with various embodiments. The USB platform of FIG. 7 may generally be related to a hardware-based persistent enumeration process.

Specifically, the USB platform 700 may be similar to, and include elements similar to those of, the USB platform 300. For example, the USB platform 700 may include a processor 705, a storage 707, a host controller 710, a USB 2.0 port 715, a USB 2.0 on-board device 720, a USB 3.0 port 725, a USB 3.0 on-board device 730, a USB 3.0 port 735, and a USB 2.0 port 740 which may be respectively similar to, and share one or more characteristics of, processor 305, storage 307, host controller 310, USB 2.0 port 315, USB 2.0 on-board device 320, USB 3.0 port 725, USB 3.0 on-board device 330, USB 3.0 port 335, and USB 2.0 port 340.

The USB platform 700, and specifically the USB host controller 710, may also include a number of registers. Specifically, the USB platform 700 may include a USB persistent enumeration register 750, and a USB persistent device address register 745. These registers 745 and 750 may allow the host controller 710 to bypass the software enumeration process described above with respect to FIGS. 4-6.

Specifically, at boot-up, the USB host controller 710 may identify that various USB devices that are communicatively coupled with it. For example, the USB host controller 710 may identify that USB devices such as devices 720 or 730 are communicatively coupled with the USB host controller. Upon identification, the USB host controller 710 may check the USB persistent enumeration register 750. The USB persistent enumeration register 750 may include a number of entries which may indicate a port such as the ports 715, 725, 735, 740, etc. In some cases, a plurality of entries may be used to indicate a single port. For example, entries B3, B2, B1, and B0 may indicate the port 715, or some other port. Similarly, entries P3, P2, P1, and P0 may indicate a different port such as port 725. In other embodiments a different number of entries may be used to indicate a given port. Additionally, in other embodiments the USB persistent enumeration register 750 may include more or fewer entries than the eight depicted in FIG. 7. If the USB host controller 710 identifies that an entry in the USB persistent enumeration register 750 indicates a port on which the USB host controller 710 identified a USB device, then the USB host controller 710 may identify that the USB device is persistent coupled with the USB host controller and a persistent enumeration process should be performed.

If the USB host controller 710 identifies that the persistent enumeration process should be performed, then the USB host controller 710 may access hashed data related to the USB device, for example as may be stored in storage 707 or elsewhere. The USB host controller 710 may also access the USB persistent device address register 745 to identify an address that is to be used to communicate with the USB device. The USB host controller 710 may then be able to provide the address information to the USB device, for example in a manner similar to that described above with respect to element 425. The USB host controller 710 may also use the hashed information to identify configuration information related to the USB device. The USB host controller 710 may be able to provide this configuration information to the USB device in a configuration packet such as that described above with respect to element 445. In this way, the USB host controller 710 may be able to perform addressing and configuration of the USB device in a USB enumeration technique without requesting additional information from the USB device. For example, elements of a software-based enumeration process such as elements 415, 420, 435, and 440 may not be performed in the hardware-based enumeration process described above.

Figure 8:
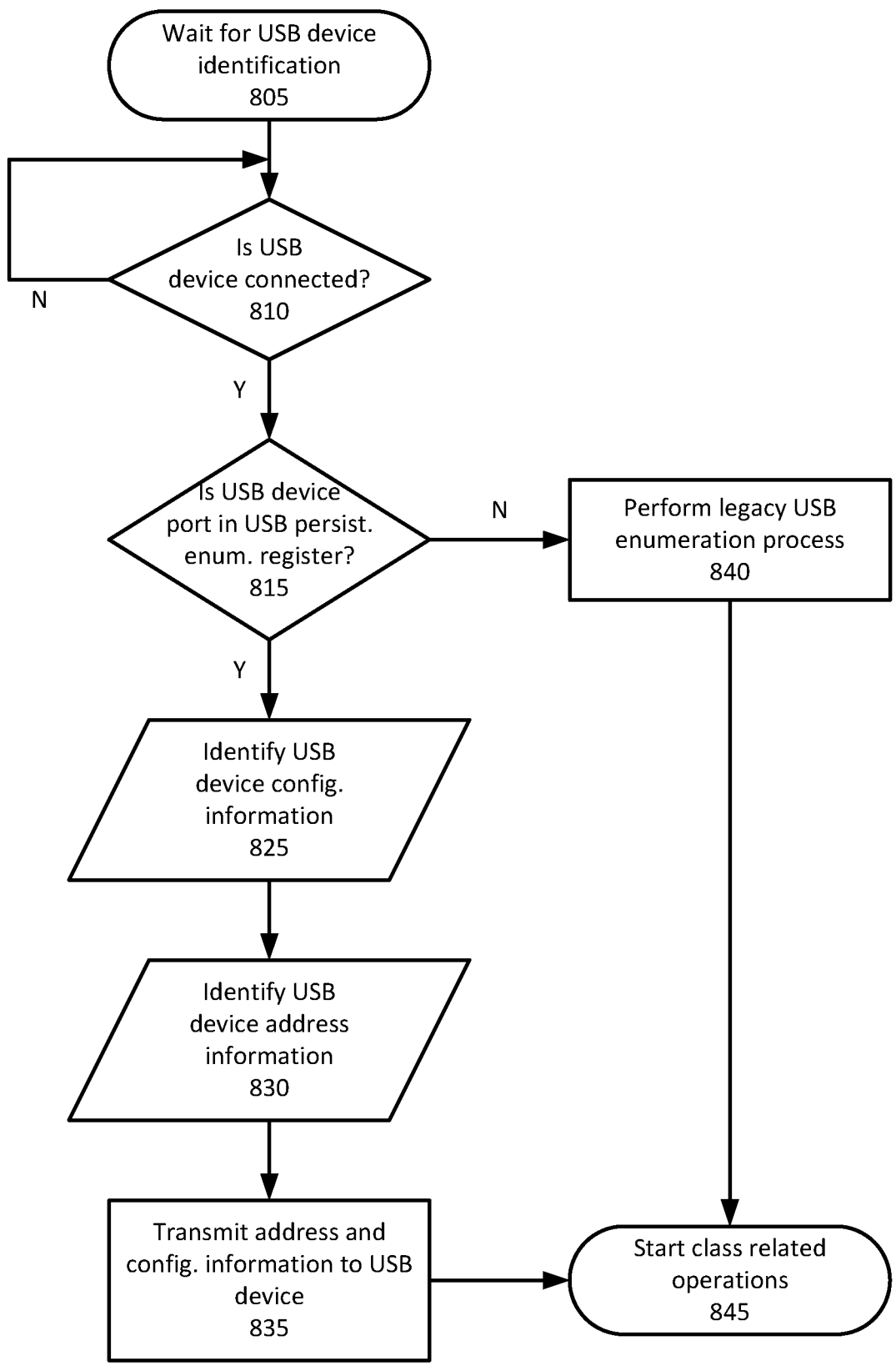
FIG. 8 illustrate a high-level example of a hardware-based persistent USB device enumeration process flow, in accordance with various embodiments.

FIG. 8 illustrate a high-level example of a hardware-based persistent USB device enumeration process flow, in accordance with various embodiments. Specifically, FIG. 8 depicts the process flow from the point of view of a host controller such as host controller 710.

Similarly to the process of FIG. 5, the process may include waiting, at 805, for identification of a USB device. For example, even though the USB device and the host controller may be persistently connected, when the electronic device is powered on there may be an initial period where the USB host controller is still identifying USB elements of the host controller. Therefore, the USB host controller may repeatedly query whether a USB device is connected at 810. If no USB device is identified, then the host controller may wait a given period of time before performing the query again.

If the USB host controller identifies a USB device at 810 then the USB host controller may identify, at 815, whether the port on which the USB device is identified is in the USB persistent enumeration register.

If the USB host controller identifies that the port is in the USB persistent enumeration register at 815, then the USB host controller may identify USB device configuration information at 825. The USB device configuration information may be identified based on, for example, pre-stored information or hashed values related to the USB device as described above. Similarly, the USB host controller may identify USB device address information at 830 as described above. The USB host controller may then transmit, at 835, the address and the configuration to the USB device at 835. Using this address and configuration information, the USB host controller and the USB device may start class-related operations at 845. It will also be noted that if the host controller identifies at 815 that the port on which the USB device is located is not in the persistent enumeration register, then the USB host controller may perform a legacy USB enumeration process at 840 and being class-related operations at 845.

It will be understood that the above-described process is intended as one high-level example, and in other embodiments elements may be performed in a different order, some elements may be performed concurrently, or there may be more or fewer elements. For example, in some embodiments elements 825 and 830 may be performed concurrently or in a different order than depicted. In some embodiments element 835 may be split such that transmitting the address information to the USB device is separate from transmitting the configuration information to the USB device. Other variations may be present in other embodiments.

Figure 9:
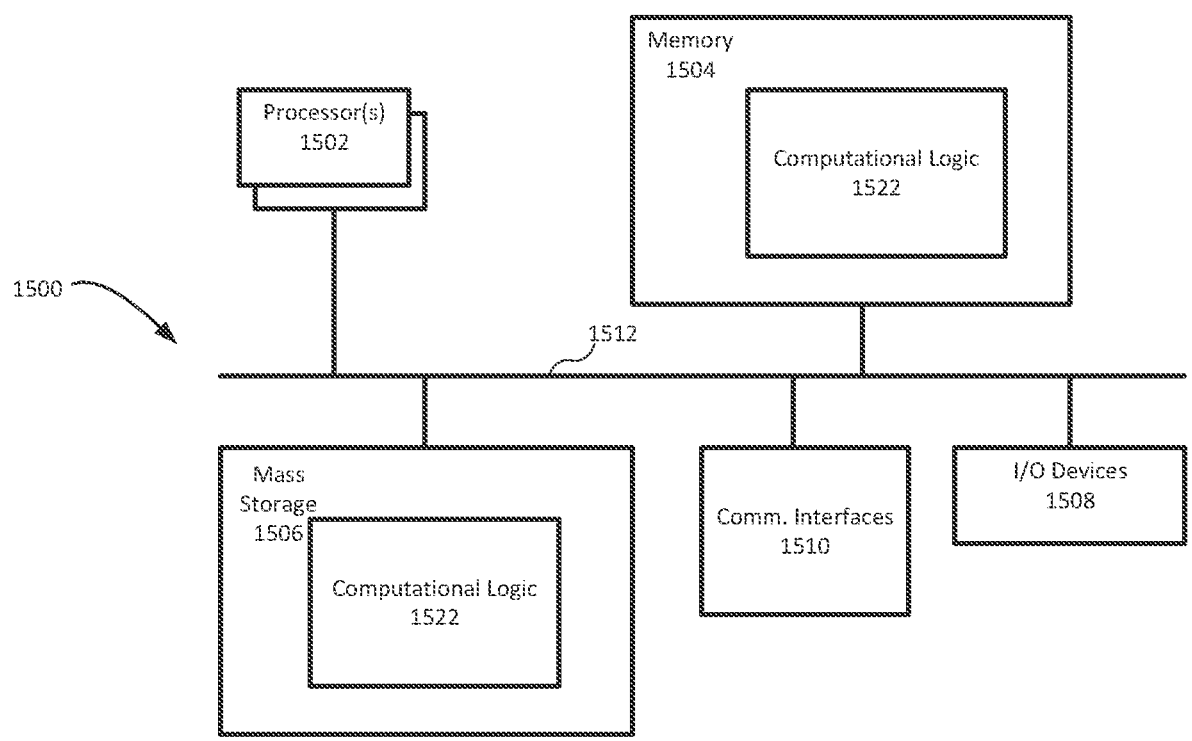
FIG. 9 illustrates an example device that may use various embodiments herein, in accordance with various embodiments.

FIG. 9 illustrates an example computing device 1500 suitable for use with USB platforms 300 or 700, in accordance with various embodiments. Specifically, in some embodiments, the computing device 1500 may include one or more of the USB platforms 300 or 700 therein.

As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a CPU, a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., DRAM, compact disc read-only memory (CD-ROM), digital versatile disk (DVD), and so forth)). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, h and/or DRAM. Non-volatile memory may include, but is not limited to, electrically erasable programmable read-only memory, phase change memory, resistive memory, and so forth. In some embodiments, one or both of the system memory 1504 or the mass storage device 1506 may include computational logic 1522, which may be configured to implement or perform, in whole or in part, one or more instructions that may be stored in the system memory 1504 or the mass storage device 1506. In other embodiments, the computational logic 1522 may be configured to perform a memory-related command such as a read or write command on the system memory 1504 or the mass storage device 1506.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The computing device 1500 may further include or be coupled with a power supply. The power supply may, for example, be a power supply that is internal to the computing device 1500 such as a battery. In other embodiments the power supply may be external to the computing device 1500. For example, the power supply may be an electrical source such as an electrical outlet, an external battery, or some other type of power supply. The power supply may be, for example alternating current (AC), direct current (DC) or some other type of power supply. The power supply may in some embodiments include one or more additional components such as an AC to DC convertor, one or more downconverters, one or more upconverters, transistors, resistors, capacitors, etc. that may be used, for example, to tune or alter the current or voltage of the power supply from one level to another level. In some embodiments the power supply may be configured to provide power to the computing device 1500 or one or more discrete components of the computing device 1500 such as the processor(s) 1502, mass storage 1506, I/O devices 1508, etc.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

In some embodiments, as noted above, computing device 1500 may include one or more of USB platforms 300 or 700. Specifically, in embodiments processor 1502 may be similar to processors 305 or 705. Storage 1506 may be similar to storage 307 or 707. I/O devices 1508 may be, for example, USB devices such as on-board devices 320/330/720/730.

EXAMPLES OF VARIOUS EMBODIMENTS

Example 1 includes a universal serial bus (USB)-enabled apparatus comprising: a processor; a persistent USB device that is hardwired to the apparatus; and a USB host controller communicatively coupled with the processor and the USB device, wherein the USB host controller includes: a port register that includes an indication, based on a port by which the USB device is coupled with the USB host controller, that the USB device is hardwired to the apparatus; and an address register that indicates an address that is to be used for USB communication with the USB device.

Example 2 includes the apparatus of example 1, wherein the USB host controller is to perform USB enumeration of the USB device based on the indication.

Example 3 includes the apparatus of example 2, wherein the USB host controller is to perform the USB enumeration based on data related to the USB device, wherein the data is stored on the USB-enabled apparatus prior to beginning the USB enumeration.

Example 4 includes the apparatus of example 2, wherein the USB enumeration is to be performed without a request, by the USB host controller, for additional data from the USB device.

Example 5 includes the apparatus of any of examples 1-4, wherein the USB device is a camera.

Example 6 includes the apparatus of any of examples 1-4, wherein the USB device is a USB device of a plurality of USB devices, and respective USB devices of the plurality of USB devices are hardwired to the apparatus.

Example 7 includes the apparatus of any of examples 1-4, wherein the apparatus is a motor vehicle.

Example 8 includes one or more non-transitory computer-readable media comprising instructions that, upon execution of the instructions, are to cause a universal serial bus (USB) host controller to: identify a USB device that is communicatively coupled with the USB host controller; identify a binary device object store (BOS) descriptor received by the USB host controller from the USB device; identify, based on the BOS descriptor, USB device information related to the USB device, wherein the USB device information is stored prior to the identification of the USB device; and perform, based on the USB device information, USB enumeration of the USB device.

Example 9 includes the one or more non-transitory computer-readable media of example 8, wherein the USB device is a camera.

Example 10 includes the one or more non-transitory computer-readable media of example 8, wherein the USB device is communicatively coupled with the USB host controller by a persistent connection.

Example 11 includes the one or more non-transitory computer-readable media of example 10, wherein the BOS descriptor includes an indication that the USB device is communicatively coupled with the USB host controller by the persistent connection.

Example 12 includes the one or more non-transitory computer-readable media of any of examples 8-11, wherein the USB device information is stored on the host controller or in a storage communicatively coupled with the host controller.

Example 13 includes the one or more non-transitory computer-readable media of any of examples 8-11, wherein the identification of the USB device information is based on a device hash that is organized based on an element of the BOS descriptor.

Example 14 includes the one or more non-transitory computer-readable media of example 13, wherein the element of the BOS descriptor is a vendor identification, a product identification, a configuration identification, or an interface identification.

Example 15 includes a method of universal serial bus (USB) enumeration, the method comprising: identifying, by a USB device, a binary device object store (BOS) descriptor related to the USB device, wherein the BOS descriptor includes an indication that the USB device is persistently communicatively coupled with a USB host controller of an electronic device; and transmitting, by the USB device, the BOS descriptor to the USB host controller.

Example 16 includes the method of example 15, wherein the transmitting of the BOS descriptor is based on identification of a request received from the USB host controller.

Example 17 includes the method of example 16, wherein the request is a SetupPkt GetDescriptor message received from the USB host controller.

Example 18 includes the method of any of examples 15-17, wherein the USB host controller is to perform USB enumeration of the USB device based on the BOS descriptor.

Example 19 includes the method of example 18, wherein the USB host controller is to perform USB enumeration of the USB device based on pre-stored data that is indexed by an element of the BOS descriptor.

Example 20 includes the method of example 19, wherein the element of the BOS descriptor is a vendor identification, a product identification, a configuration identification, or an interface identification.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A universal serial bus (USB)-enabled apparatus comprising:
a processor;
a persistent USB device that is hardwired to the apparatus by a persistent connection;
a USB port; and
a USB host controller communicatively coupled with the processor and the USB device, wherein the USB host controller includes:
port register that includes an indication, based on a port by which the USB device is coupled with the USB host controller, that the USB device is hardwired to the apparatus, and
an address register that indicates an address that is to be used for USB communication with the USB device;
wherein the USB host controller is to enumerate the persistent USB device using a persistent USB device enumeration process, and the persistent USB device enumeration process uses the port register and the address register; and
wherein the USB host controller is to, upon coupling of a non-persistent USB device to the apparatus via the USB port, enumerate the non-persistent USB device using a non-persistent USB device enumeration process, and the persistent USB device enumeration process has a duration that is less than a duration of the non-persistent USB device enumeration process.

2. The apparatus of claim 1, wherein the persistent USB device enumeration process uses data related to the USB device, wherein the data is stored on the apparatus prior to beginning the persistent USB device enumeration process.

3. The apparatus of claim 1, wherein the persistent USB device enumeration process does not include a request, by the USB host controller, for additional data from the USB device.

4. The apparatus of claim 1, wherein the USB device is a camera.

5. The apparatus of claim 1, wherein the USB device is one of a plurality of USB devices, and individual USB devices of the plurality of USB devices are hardwired to the apparatus.

6. The apparatus of claim 1, wherein the apparatus is a motor vehicle.

7. One or more non-transitory computer-readable media comprising instructions that, upon execution of the instructions, are to cause a universal serial bus (USB) host controller to:
- identify a first USB device that is communicatively coupled with the USB host controller by a persistent hardwired connection;
- identify a binary device object store (BOS) descriptor received by the USB host controller from the first USB device;
- identify, based on the BOS descriptor, USB device information related to the first USB device,
- wherein the USB device information is stored prior to the identification of the first USB device;
- perform, based on the USB device information, a persistent USB device enumeration process for the first USB device;
- identify a second USB device that is communicatively coupled with the USB host controller by a non-persistent connection;
- perform a non-persistent USB device enumeration process for the second USB device, wherein the persistent USB device enumeration process is faster than the non-persistent USB device enumeration process.

8. The one or more non-transitory computer-readable media of claim 7, wherein the USB device is a camera.

9. The one or more non-transitory computer-readable media of claim 7, wherein the BOS descriptor includes an indication that the USB device is communicatively coupled with the USB host controller by the persistent connection.

10. The one or more non-transitory computer-readable media of claim 7, wherein the USB device information is stored on the host controller or in a storage communicatively coupled with the host controller.

11. The one or more non-transitory computer-readable media of claim 7, wherein the identification of the USB device information is based on a device hash that is organized based on an element of the BOS descriptor.

12. The one or more non-transitory computer-readable media of claim 11, wherein the element of the BOS descriptor is a vendor identification, a product identification, a configuration identification, or an interface identification.

13. A method of universal serial bus (USB) enumeration, the method comprising:
- identifying, by a USB device, a binary device object store (BOS) descriptor related to the USB device, wherein the BOS descriptor includes an indication that the USB device is persistently communicatively coupled with a USB host controller of an electronic device; and
- transmitting, by the USB device, the BOS descriptor to the USB host controller, wherein the USB host controller is to perform a persistent USB device enumeration process for the USB device after receipt, by the USB host controller, of the BOS descriptor, wherein the USB host controller is configured to perform a non-persistent USB device enumeration process for another USB device that does not provide an indication to the USB host controller that the other USB device is persistently communicatively coupled with the USB host contoller, and wherein an amount of time required for the persistent USB device enumeration process is less than an amount of time required for the non-persistent USB device enumeration process.

14. The method of claim 13, wherein the transmitting of the BOS descriptor is based on identification of a request received from the USB host controller.

15. The method of claim 14, wherein the request is a SetupPkt GetDescriptor message received from the USB host controller.

16. The method of claim 13, wherein the USB host controller is to perform USB enumeration of the USB device based on the BOS descriptor.

17. The method of claim 16, wherein the USB host controller is to perform USB enumeration of the USB device based on pre-stored data that is indexed by an element of the BOS descriptor.

18. The method of claim 13, wherein the BOS descriptor includes a vendor identification, a product identification, a configuration identification, or an interface identification.

* * * * *

UNITED STATES PATENT AND TRADEMARK OFFICE
CERTIFICATE OF CORRECTION

PATENT NO. : 10,963,406 B2  
APPLICATION NO. : 16/445027  
DATED : March 30, 2021  
INVENTOR(S) : Abdul Rahman Ismail et al.

Page 1 of 1

It is certified that error appears in the above-identified patent and that said Letters Patent is hereby corrected as shown below:

In the Claims

In Column 16, Line 36, in Claim 1, delete "port register" and insert -- a port register --, therefor.

In Column 18, Line 17, in Claim 13, delete "another" and insert -- an other --, therefor.

In Column 18, Line 21, in Claim 13, delete "contoller," and insert -- controller, --, therefor.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*